US007547204B2

(12) United States Patent
Tokita et al.

(10) Patent No.: US 7,547,204 B2
(45) Date of Patent: Jun. 16, 2009

(54) NANO-PRECISION SINTERING SYSTEM

(75) Inventors: Masao Tokita, Kawasaki (JP); Shinichi Suzuki, Kawasaki (JP); Katsuyuki Nakagawa, Kawasaki (JP)

(73) Assignee: SPS Syntex Inc., Kanagawa (JP)

( * ) Notice: Subject to any disclaimer, the term of this patent is extended or adjusted under 35 U.S.C. 154(b) by 29 days.

(21) Appl. No.: 11/666,616

(22) PCT Filed: Nov. 2, 2005

(86) PCT No.: PCT/JP2005/020225

§ 371 (c)(1), (2), (4) Date: Nov. 27, 2007

(87) PCT Pub. No.: WO2006/049218

PCT Pub. Date: May 11, 2006

(65) Prior Publication Data

US 2008/0175936 A1 Jul. 24, 2008

(30) Foreign Application Priority Data

Nov. 2, 2004 (JP) ............................ 2004-318835

(51) Int. Cl.
*B22F 3/14* (2006.01)
*B29C 43/16* (2006.01)

(52) U.S. Cl. ..................................... 425/78; 425/174.6

(58) Field of Classification Search .................. 425/78, 425/174.6, 504, 352–355
See application file for complete search history.

(56) References Cited

U.S. PATENT DOCUMENTS 4,325,734 A * 4/1982 Burrage et al. ................ 425/78
6,371,746 B1 * 4/2002 Shiomi et al. ................. 425/78
6,383,446 B1 5/2002 Tokita

FOREIGN PATENT DOCUMENTS

JP 2000-345208 12/2000
JP 2002-105507 4/2002
JP 2002-167607 6/2002
JP 2003-193112 7/2003

* cited by examiner

*Primary Examiner*—Yogendra Gupta
*Assistant Examiner*—Thu Khanh T Nguyen
(74) *Attorney, Agent, or Firm*—Wenderoth, Lind & Ponack, L.L.P.

(57) ABSTRACT

The present invention provides a nano-precision sintering system 1 for sintering a nano-sized powder of a material in the pulse energization and pressure sintering process to obtain a highly purified sintered compact having a nano-sized grain structure, said nano-precision sintering system 1 comprising: at least one pre-process chamber 20 defined by at least one sealed housing 21 having at least one glove and designed to be controlled into a predetermined atmosphere; a sintering process chamber 30 defined by a sealed housing 31 having at least one glove and designed to be controlled into a predetermined atmosphere; a shut-off system 26 disposed in a passage providing communication between the pre-process chamber and the sintering process chamber so as to block the communication between the two chambers selectively while keeping it in an air tight condition; and a pulse energization and pressure sintering machine 50 having a vacuum chamber "C" allowing for the sintering process to be carried out under a vacuum atmosphere, wherein the vacuum chamber is disposed in the sintering process chamber such that the former can be isolated from the latter.

10 Claims, 8 Drawing Sheets

NANO-PRECISION SINTERING SYSTEM

TECHNICAL FIELD

The present invention relates to a nano-precision sintering system for manufacturing a sintered compact having nano-sized grains and/or crystalline structures, and more specifically, to a nano-precision sintering system for manufacturing a sintered compact having nano-sized grains and/or crystalline structures by sintering a nano-sized powder of a starting material, while suppressing grain growth, by using a pulse energization and pressure sintering process.

BACKGROUND ART

Recently, studies on a nano-structural material have been conducted in various fields. Particularly in the field of powder sintering, a technology has been studied and developed that is directed to produce a sintered compact (for e.g., a nano-phase material based on metals or ceramics, a nano-composite material and the like) by using a nano-sized powder of a starting material. A sintering process typically takes a long time with a prior art sintering process that simply provides heating and pressing, in which even if a nano-sized powder of a starting material is advantageously used for sintering, grain growth is likely to occur in the course of sintering and indeed, the observation on a grain diameter of a thus sintered compact shows that the crystalline grain has grown significantly as compared to the original nano size of the starting material. In the above-described circumstances, there has been a need for sintering technology to control the minute structure of the grain or to control grain growth, which requires essentially that the sintered process be carried out in a short time.

The inventors of the present invention have devoted themselves for many years to the development of, what is called, the pulse energization and pressure sintering process, such as the spark plasma sintering or the plasma activated sintering, as well as a sintering apparatus and system with which the same sintering process can be carried out, and they have found that the pulse energization and pressure sintering process is extremely useful for sintering with use of the nano-sized powder of a material (herein, the term, nano-sized powder of a material, refers to a powder having a powder size in itself defined by the nano order and a powder having the powder size defined by the micron order but comprising a crystalline structure defined by the nano order). However, they have also found that suppressing the grain growth simply by using the conventionally known pulse energization and pressure sintering apparatus would be insufficient to produce a highly purified sintered compact with ultra high precision and high function and also having a structure defined by a nano-sized crystal grain diameter by sintering a nano-sized powder of a material containing no impurities. This is due to a drawback explained by a known fact that the nano-sized powder has a larger specific surface area compared with an ordinary type of powder defined by the micron order and also has a high activity in the grain surface that could form an oxide film easily, when exposed to the atmosphere, which oxide film could be deposited on the grain boundary or dispersed internally during synthesizing of the material, thus inhibiting a desired property from being obtained.

List of Patent Documents

[Patent Document 1]

Japanese Patent Laid-open Publication No. 2000-345208

DISCLOSURE OF THE INVENTION

Problem to be Solved by the Invention

An object of the present invention is to provide a nano-precision sintering system for sintering a nano-sized powder of a starting material to form a sintered compact with ultra high precision and high function having a structure defined by a nano-sized crystal grain diameter.

Another object of the resent invention is to provide a nano-precision sintering system for sintering a nano-sized powder of a starting material by using the pulse energization and pressure sintering process, while keeping the powder in its inherently pure condition by preventing the powder from being oxidized by the atmosphere and being contaminated by dust, dirt or adsorbed moisture.

Yet another object of the present invention is to provide a nano-precision sintering system for sintering a powder of a material to form a nano sintered compact of high precision by means of such an arrangement that a vacuum chamber capable of holding a sintering atmosphere substantially vacuum is housed in a glove box capable of controlling the interior atmosphere desirably, so that a sintering mold can be filled with the powder of a material while they are protected against the oxidation by the atmosphere and the contamination by dust, dirt or adsorbed moisture, and then the powder of a material can be sintered in a vacuum condition to form the nano sintered compact of high precision.

Means to Solve the Problem

According to an invention as defined in claim 1, provided is a nano-precision sintering system for sintering a nano-sized powder of a material in the pulse energization and pressure sintering process to obtain a highly purified sintered compact having a nano-sized grain structure, the nano-precision sintering system characterized by comprising:

at least one pre-process chamber defined by at least one sealed housing and designed to be controlled into a predetermined atmosphere;

a sintering process chamber defined by a sealed housing and designed to be controlled into a predetermined atmosphere;

a shut-off system operatively disposed in a passage providing a communication between the pre-process chamber and the sintering process chamber so as to block the communication between the both chambers selectively while keeping it in the air tight condition; and a pulse energization and pressure sintering machine having a vacuum chamber allowing for the sintering process to be carried out under a vacuum atmosphere or an inert gas atmosphere, wherein the vacuum chamber is disposed in the sintering process chamber such that the vacuum chamber can be isolated from the sintering process chamber, measuring a weight of the powder of a material, filling a sintering mold with the powder of a material, inserting an upper punch into the sintering mold and pressing the powder of a material in the sintering mold are executable within the pre-process chamber, and placing the sintering mold filled with the powder of a material into the sintering machine can be carried out under the predetermined atmosphere within the sintering process chamber without being exposed to an external air.

According to the invention as described above, surface features of the powder of a starting material provided in a preparation stage can be maintained without any oxidation or contaminations so as to produce the highly purified sintered compact having the structure defined by the nano-sized crystal grain diameter.

According to an invention as defined in claim 2, provided is a nano-precision sintering system as described above, further comprising a material loading chamber disposed adjacent to the pre-process chamber such that the material loading chamber can be sealed against the external air and also can be isolated from the pre-process chamber selectively while being held in the air tight condition, wherein an interior of the material loading chamber can be controlled into a predetermined atmosphere.

According to this invention, since the chamber for loading the material is provided and advantageously the chamber interior has the controlled atmosphere, therefore further purified sintered compact can be obtained.

According to an invention as defined in claim 3, provided is a nano-precision sintering system as described above, in which the vacuum chamber is coupled to a first vacuum exhaust system, and at least one of the pre-process chamber and the sintering process chamber is coupled to a second vacuum exhaust system independent from the first vacuum exhaust system. Further, according to an invention as defined in claim 4, provided is a nano-precision sintering system as described above, in which the vacuum chamber is coupled to a first vacuum exhaust system, and the material loading chamber and the sintering process chamber are coupled to a second vacuum exhaust system independent from the first vacuum exhaust system.

According to those inventions, filling of the pre-process chamber or the sintering chamber with the inert gas as well as controlling of the oxygen concentration in the inert gas can be carried out quickly.

According to an invention as defined in claim 5, provided is a nano-precision sintering system as described above, further comprising a mill for mixing and grinding the powder of a material, a weighing scale for measuring a weight of the powder of a material prepared by the mill and a pressing device for pressing the powder of a material filled in the sintering mold, all of which are disposed in the pre-process chamber.

According to this invention, the sintering process can be carried out without exposing any of the powder of a material to the external air, and additionally, since the powder of a material can be pressed to increase a packing density, therefore the resultant sintered compact can be controlled to have a desired compactness and thickness.

According to an invention as defined in claim 6, provided is a nano-precision sintering system as described above, further comprising a conveyer system disposed in the pre-process chamber for delivering the sintering mold filled with the powder of a material through the passage into the sintering process chamber without exposing to the external air.

According to an invention as defined in claim 7, provided is a nano-precision sintering system as described above, in which the pre-process chamber, the material loading chamber and the sintering process chamber are coupled to a gas circulating and refining system capable of supplying an inert gas to those chambers and also capable of decreasing an oxygen concentration in the inert gas to a predetermined value.

According to this invention, since the inert gas can be circulated and thus reusable, the used inert gas is no more exhausted into the atomosphere, contributing to saving resources and protecting environment.

According to an invention as defined in claim 8, provided is a nano-precision sintering system as described above, further comprising a glove assembly, the glove assembly comprising: an attachment member fixed to a sidewall of the housing as being held in the air tight condition; a holding member removably attached to the attachment member so as to cooperate with the attachment member to clamp and hold an opening region of the glove; and a lid adapted to be removably fitted in the holding member.

According to an invention as defined in claim 9, provided is a nano-precision sintering system as described above, in which the sealed housing defining the pre-process chamber comprises at least one pair of gloves, and the sealed housing defining the sintering process chamber comprises at least one pair of gloves, wherein measuring a weight of the powder of a material, filling a sintering mold with the powder of a material, inserting an upper punch into the sintering mold and pressing the powder of a material in the sintering mold, all to be executed within the pre-process chamber, are executable by an operator via the gloves and the placing the sintering mold filled with the powder of a material into the sintering machine is executable by the operator via the gloves of the sintering process chamber.

According to an invention as defined in claim 10, provided is a nano-precision sintering system as described above, further comprising within the pre-process chamber: a hopper for receiving the powder of a material; a supply system operable to measure and dispense the powder of a material contained in the hopper for supplying; a filling system for filling the sintering mold with a predetermined amount of the powder of a material supplied by the supply system; a means for unsealing a sealed container delivered into the pre-process chamber and loading the powder of a material contained therein into the hopper; and an automatic control unit for controlling automatically an operation of the systems and means.

DESCRIPTION OF REFERENCE NUMERALS

Figure 1:
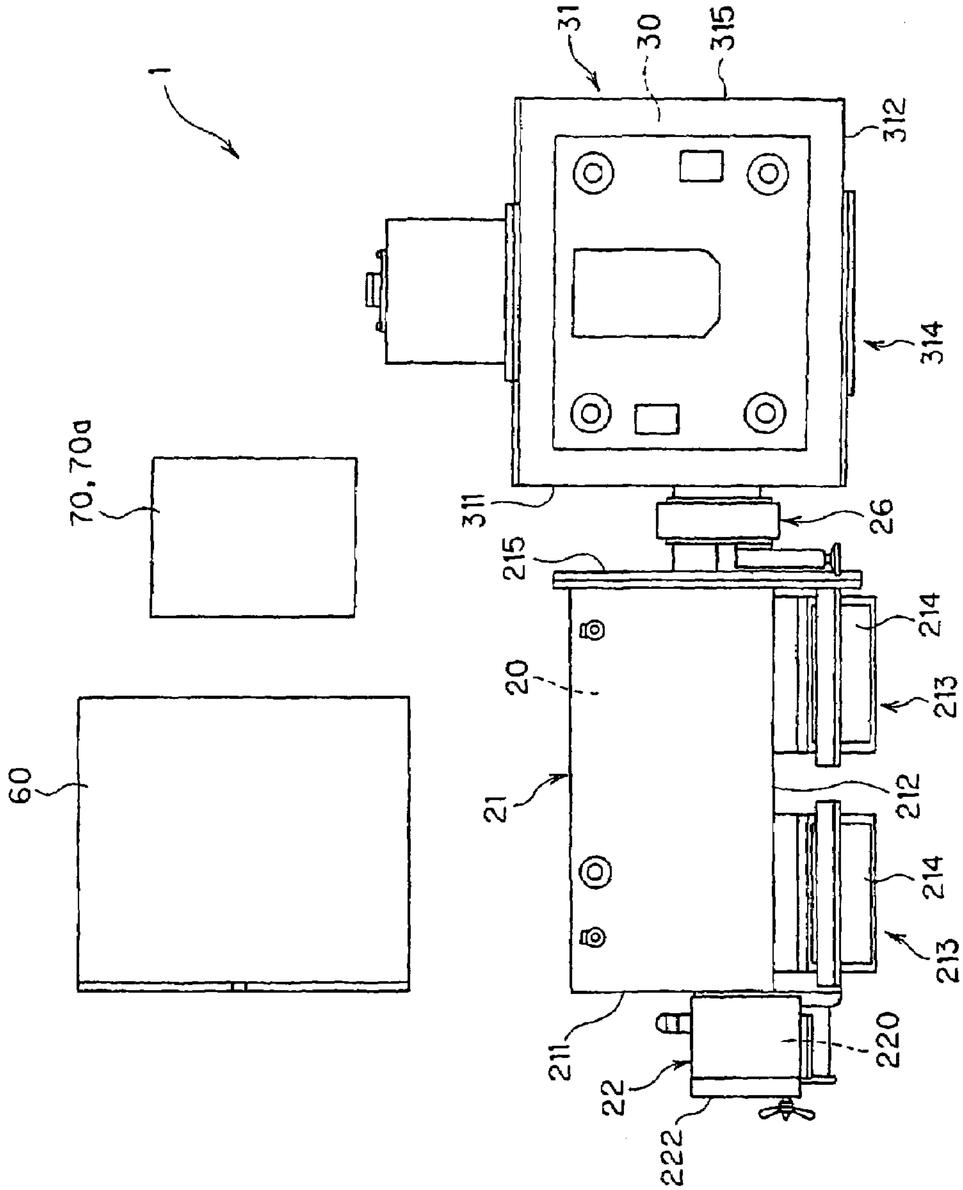
FIG. 1 is a schematic plan view of an embodiment of a nano-precision sintering system of the present invention.

1 Nano-precision sintering system
20 Pre-process chamber
21 Housing
22 Loading housing
24 Glove assembly
25 Communication tube
26 Gate valve
30 Post-process chamber
31 Housing

50 Sintering machine
523 Lower housing
533 Upper housing
541 Lower energizing electrode
551 Upper energizing electrode
C Sintering chamber

EMBODIMENTS FOR CARRYING OUT THE INVENTION

Preferred embodiments of a nano-precision (or nano-ultra-precision) sintering system according to the present invention will be described below with reference to the attached drawings.

For the purpose of maintaining the purity of a product by preventing degradation in the quality of a powder of a material due to oxidation in the powder and any impurities entering into the powder after its having been prepared or after a sealed container containing the powder having been unsealed and further by preventing degradation of the powder during the filling of the powder or the placing into a sintering machine, a nano-precision (nano-ultra-precision) sintering system according to an embodiment of the present invention is designed such that a series of following operations including: mixing and grinding of the powder of a material; storing the prepared powder of a material; measuring a weight of the powder of material; filling a mold with the powder of a material; and placing the sintering mold filled with the powder of a material into the sintering machine, can be carried out within a chamber of what is called a glove box type having a controllable atmosphere, and the pulse energization and pressure sintering process can be carried out under a vacuum atmosphere.

With reference to FIG. 1, one embodiment of a nano-precision sintering system according to the present invention is generally shown in a plan view. A nano-precision sintering system 1 of this embodiment comprises a sealed first housing 21 defining a pre-process chamber 20 serving for a series of operations in the pre-process covering from mixing and grinding of a powder of a material to filling a sintering mold with the prepared powder of a material and a sealed second housing 31 defining a sintering process chamber 30 in which a vacuum chamber of a pulse energization and pressure sintering machine is situated, both of which are arranged as illustrated. Each of the first and the second housing takes the form of what is called a glove box that is typically provided with a glove, through which an operator can externally carry out a task which would otherwise have to be done inside the chamber, while the chamber defined by each of the first and the second housing being shielded against the outside world.

Figure 2:
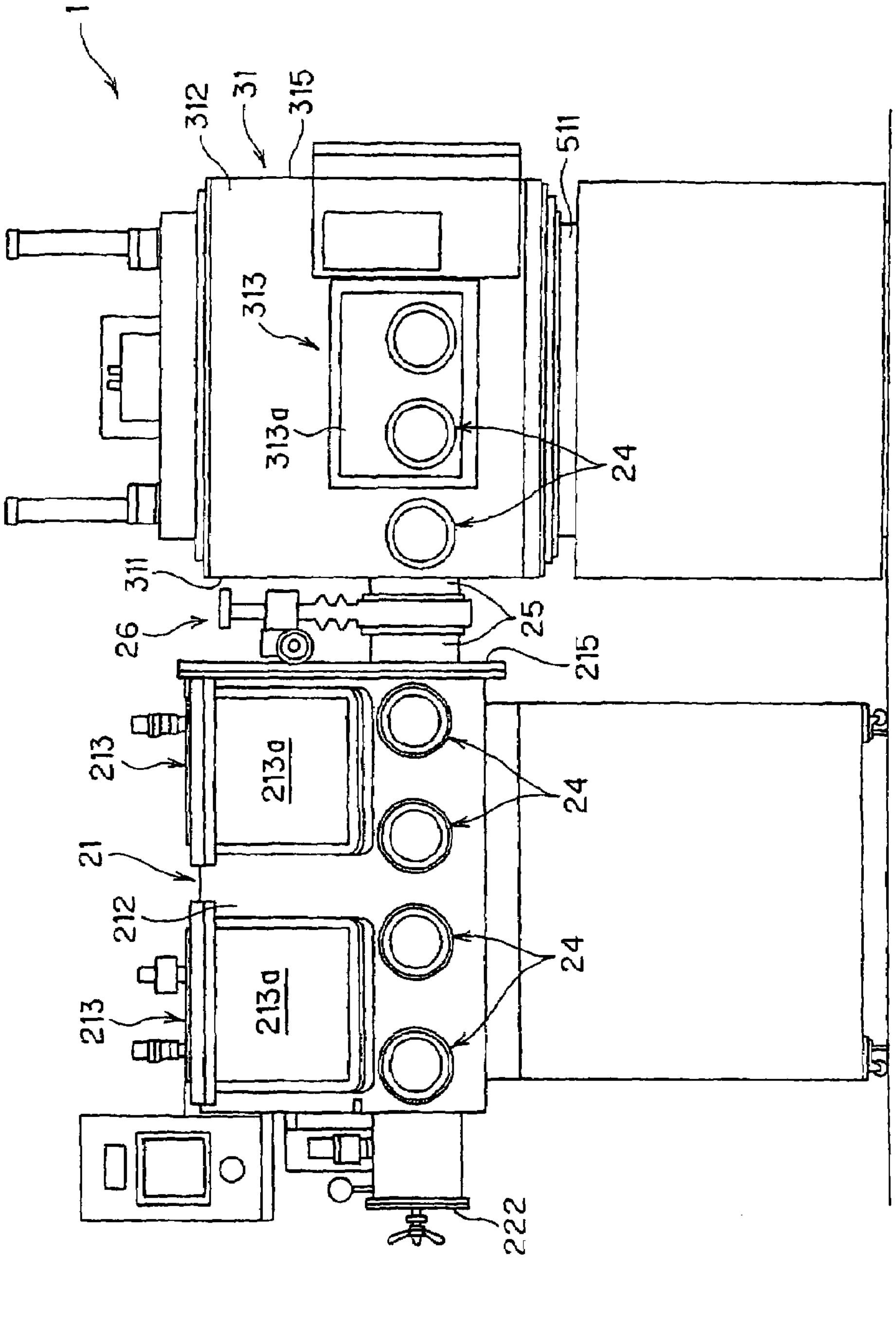
FIG. 2 is a front view of a nano-precision sintering system of FIG. 1.

With reference to FIGS. 1 and 2, the sealed first housing 21 is constructed from such an outer wall (as reinforced with a frame, for example) that can shield the pre-process chamber 20 defined by the first housing 21 against the outside world completely, as pointed above, and also that is sufficiently robust not to be broken when the pre-process chamber interior is subject to a certain level of negative pressure (e.g., 10 Pa). A sealed loading housing 22 defining a material loading chamber 220 is fixed to sidewalls 211 defined in one side of the first housing 21 (located opposite the second housing or in the left-hand side in the illustration). A gate valve having a known structure is disposed between the loading housing 22 and the sidewall 211, though not illustrated. The gate valve constructs a shut-off system of an air tight type in which, when placed in a closing position, the gate valve blocks the communication between the pre-process chamber 20 and the loading chamber 220 in the air tight condition, and when placed in an opening position, the gate valve permits the communication therebetween. This loading housing 22 also has a structure, such as a cylindrical structure, that is sufficiently robust not to be broken when the interior of a material loading chamber 220 is subject to a certain level of negative pressure (e.g., 10 Pa). A cover 222 is provided in an end of the loading housing 22 opposite the first housing, which is capable of being opened and closed manually by a known method and also capable of closing an opening of the material loading chamber 220 in the air tight condition. It is to be noted that a floor surface of the material loading chamber 220 is flat, though not illustrated. The first housing 21 is mounted on a base table 23.

Two relatively large windows 213 are arranged in a sidewall 212 in the front side of the sealed first housing 21. Each of those windows 213 is fitted with window glass **213*a* allowing the operator to externally view the housing interior. This window is reinforced by a known method so that the window glass 231*a* would not be broken when the pre-process chamber interior is subject to the negative pressure, and sealed to hold the air tight condition around the window. A pair of glove assemblies 24 is installed in the front wall 212** below each of those windows, respectively.

Figure 4:
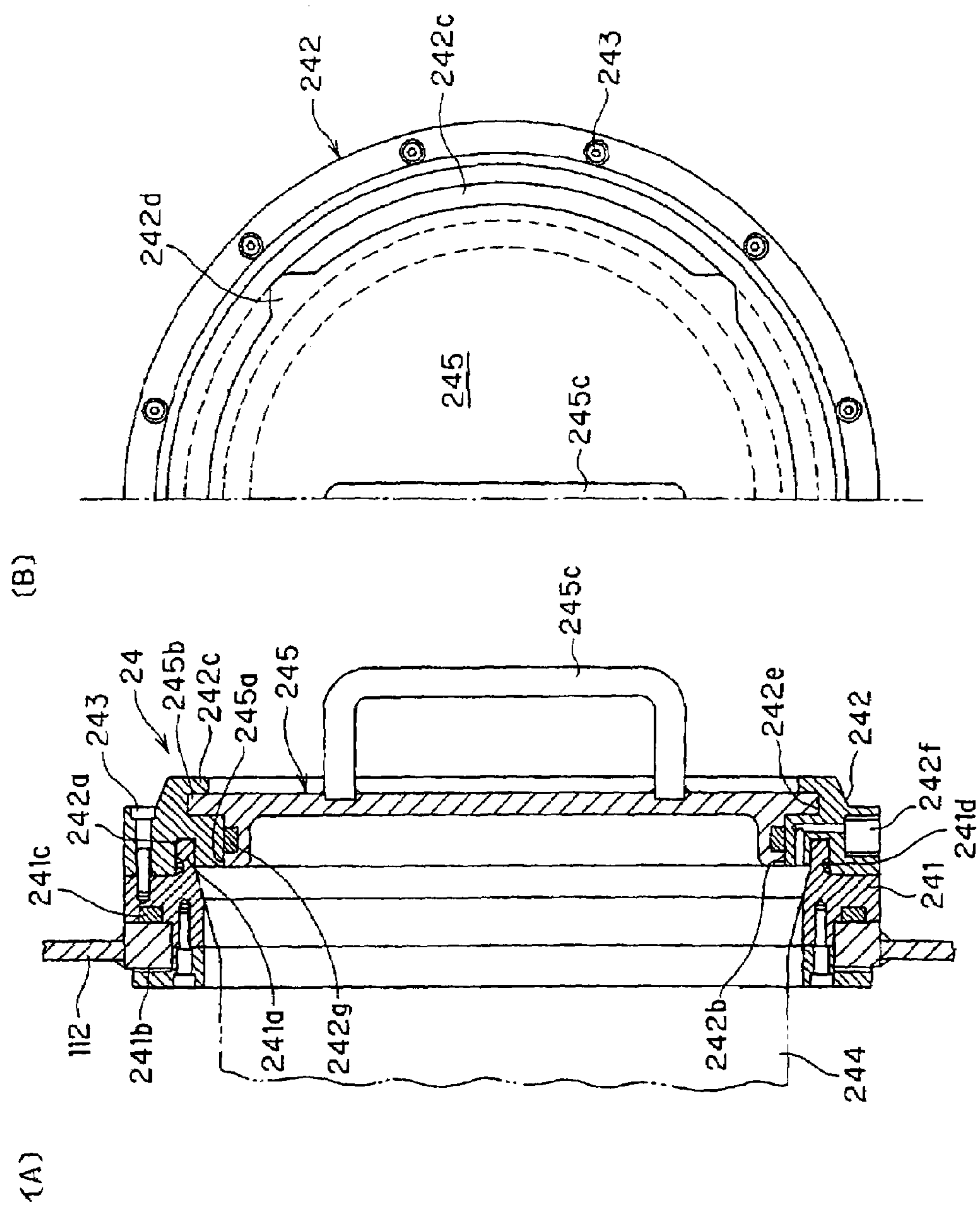
FIG. 4[A] is a sectional view of a glove assembly and FIG. 4[B] is a front view of the same glove assembly.

Each glove assembly 24, as shown in FIG. 4, comprises an annular attachment member 241 fixed to a loading port 215 in the front wall 212 of the housing 21, an annular holding member 242 adapted to be fixed to the attachment member 241 with a plurality of setscrews 243 (only one setscrew is illustrated in FIG. 4[A]), and a glove whose opening region is fixed by the attachment member 241 and the holding member 242. An annular protrusion **241*a* protruding outward (toward the right-hand side in FIG. 4) is defined in an outer surface of the attachment member 241, and an annular groove 242*a* for receiving the protrusion is defined in a corresponding surface of the holding member 242 so that an opening region of the glove 244 may be fittingly folded over the protrusion and fixedly held by the holding member 242. This way of fitting can prevent any air leakage through the glove attachment section. The glove 244 is, as a matter of course, made from an air tight material, such as rubber. A substantially circular disk-like lid 245 is removably attached to the annular holding member 242. Differently from a commonly known lid for the glove box, this lid 245 is adapted to be fully removed from the holding member 242 and thus from the housing, which will be described below in detail. Specifically, the holding member 242 defines a cylindrical inner wall surface 242*b*, and a convex portion 242*c* in an outer surface (right-hand side in FIG. 4[A]), which protrudes inward in the radial direction and extends circumferentially with a plurality of notches 242*d* formed therein (four in the illustrated embodiment but only two of them shown in FIG. 4[B]). The lid 245 defines a cylindrical outer wall surface 245*a* for engagement with the cylindrical inner wall surface 242*b* of the holding member 242 and a plurality of convex portions 245*b* (four in the illustrated embodiment) extending radially and spaced apart along a circumferential direction from each other. The convex portion 245*b* has a configuration to be fitted in the notch 242*d*, and for engagement, firstly the lid is fitted in the holding member 242 with the convex portion 245*b* placed in alignment with the notch 242*d*, then the convex portion 245*b* is inserted into the annular groove 242*e* of the holding member 242, and finally the lid 245 is turned around by an operator's hand gripping a handle 245*c* so as to be fixed with respect to the holding member. It is to be noted that reference numeral 242*f* designates an air passage used to exhaust air trapped between the outside of the glove 244 and the lid 245 (in a space inside the glove) and it is connected to the pre-process chamber via a conduit, which is not illustrated, so as to keep a balance in pressure between the pre-process chamber interior and the glove interior. It is also to be noted that reference numerals 242***g*, 241*b*, 241*c* and 241*d* designate seals, respectively.

Figure 3:
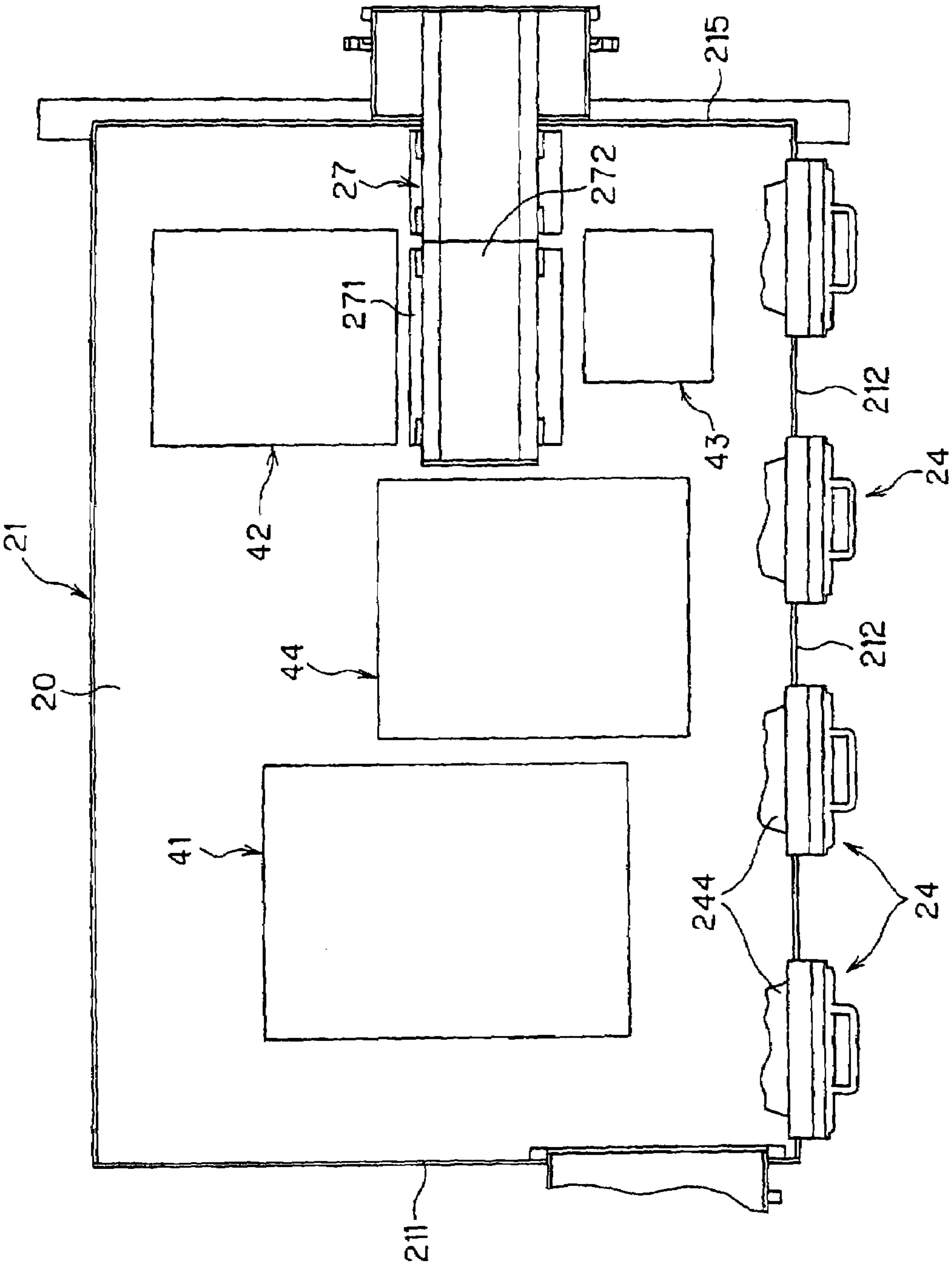
FIG. 3 is a plan view showing an interior of a pre-process chamber.

The first housing 21 and the second housing 31 are interconnected via a communication pipe 25 whose one end (left end in FIG. 2) is fixed to a sidewall 215 of the housing 21 and whose other end is fixed to a sidewall 311 of the housing 31. This communication pipe 25 also has such a structure, for example, a cylindrical structure, that is strong enough not to be broken even when a communication passage 250 interior defined by the communication pipe 25 is subject to a certain level of negative pressure (e.g., 10 Pa). A gate valve 26 is disposed in the middle of the communication pipe 25, serving as an air tight shut-off system having a known structure. The gate valve 26 is adapted so that when placed in a closing position, the gate valve 26 blocks communication between the pre-process chamber 20 defined by the first housing 21 and the sintering process chamber 30 defined by the second housing 31 in an air tight condition, and when placed in an opening position, the gate valve 26 permits communication therebetween. A conveyor system 27 is disposed within the first housing 21 adjacently to a coupling to the communication pipe 25, as shown in FIG. 3. This conveyer system comprises a pair of guide rails 271 disposed in alignment with respect to a center of the communication pipe 25 and extending in parallel with some distance therebetween and a movable table 272 to be guided movably along the guide rails. The movable table is adapted so that, when the gate valve 26 is being closed, a tip end of the movable table is positioned in the pre-process chamber 20 side with respect to the gate valve, and when the gate valve is open, the movable table is allowed to be advanced through the gate valve into the sintering process chamber 30. Although the movable table in the illustrated embodiment is adapted to move, as it is pushed by hand, it may be actuated by an actuator, such as a hydraulic cylinder, an electric motor and the like.

In the pre-process chamber 20 defined by the first housing 21, such units as a bowl mill 41 of a known structure are arranged for mixing and grinding at least one material (granular or powdered material) and thereby preparing it into a powder of a material having a desired nano-sized grain diameter; a desiccator 42 of a known structure for storing the thus prepared powder of a material; an electronic weighing scale 43 for measuring a required amount of the powder of a material; and a hand press 44 of a known structure for pressing the powder of a material after the predetermined amount of the powder of a material having been introduced into the sintering mold to form into a green compact or for releasing a resultant sintered compact produced by the sintering process with the sintering machine as described later from the sintering mold, all of which are arranged in a physical relationship as shown in FIG. 3. It is to be appreciated that the physical arrangement may be modified appropriately and conveniently and that a space dedicated for storing additional components including, for example, a sintering mold made of graphite and a press core made of graphite which is fitted in the sintering mold from above and below for pressing the powder of a material may be provided within the pre-process chamber.

The second sealed housing 31 defining the sintering process chamber 30 is provided in a combination with a pulse energization and pressure sintering machine 50 (hereinafter, simply referred to as a sintering machine) serving for carrying out the pulse energization and pressure sintering, such as the spark plasma sintering or the plasma activated sintering, as shown in detail in FIG. 5.

The sintering machine 50 in this illustrated embodiment comprises: a main body frame 51 having a table 511, a plurality (four in this embodiment) of posts 512 fixed to the table 511 and extending in an upright manner apart from one another, and an upper support plate 513 fixed to upper ends of the posts 512; a lower housing assembly 52 operatively supported by the posts 512 so as to be movable up and down; an upper housing assembly 53 operatively supported by the posts 512 so as to be movable up and down; a lower energizing electrode assembly 54 attached to the lower housing assembly 52; an upper energizing electrode assembly 55 attached to an upper support plate 513; and a driving unit 56 attached to the table 511 in a central region thereof for driving the lower movable housing assembly to move up and down. The lower housing assembly 52 has a lower movable member 521 of circular disk configuration (in the illustrated embodiment), which is slidably guided and supported by the posts 512 via bearings, and a lower housing 523 attached to the lower movable member 521. The housing 523 has a bottom panel 524 defining a bottom wall and adapted to be attached to the lower movable member 521, an annular member 525 connected to the bottom panel 524 by welding and the like and constructing an annular sidewall (a circular ring configuration in the illustrated embodiment), and a ring member 526 fixed to an upper end of the annular plate. The upper housing assembly 53 comprises an upper movable member 531 of a ring configuration which is guided and supported by the posts 512 via bearings and an upper housing 533 attached to the upper movable member 531. The upper housing comprises a top panel 534 constructing an upper wall and an annular member 535 constructing an annular sidewall (a circular ring configuration in the illustrated embodiment), in which the annular member 535 is attached in a bottom edge thereof to the upper movable member by welding or the like. The upper and the lower housings, 533 and 523, are designed to associatively define a sintering chamber or a vacuum sintering chamber C inside thereof. The upper and the lower housings are designed to provide a double-wall structure (water jacket configuration) with each of the two annular members 535 and 525 arranged to provide a space therebetween thereby to allow cooling water to flow through that space. Although this sintering chamber C is adapted to be controlled to have a vacuum atmosphere inside thereof by a system, as will be described later, via a conduit 529 coupled to the lower housing, it may be controlled to have an inert gas atmosphere or any other atmosphere. It is to be noted that a seal ring is provided in at least one of an upper surface of the ring member 526 and a lower surface of the upper movable member 531 so as to ensure the air tightness between those two surfaces. A window 539 is formed in the annular member 535 of the upper housing in order to measure a temperature of the sintering mold by using a non-contact thermometer 59. The window is provided with a window glass made of silica, which serves to maintain heat resistance inside and outside the vacuum chamber, while shielding the vacuum chamber in the air tight condition. It is to be appreciated that though not illustrated, a viewing window may be provided in the annular member 135 of the upper housing to allow the sintering chamber interior to be viewed externally. In addition, though not illustrated, a single or multiple layers of an annular thin plate of stainless steel may be provided as a heat shield plate inside the chamber to protect the inner wall of the housing from heat from the sintering mold generated during the energization sintering process. It is to be appreciated that the up and down motion of the upper and the lower housings may be automatically effected by a remote-controlled operation.

The lower energizing electrode assembly 54 comprises a lower energizing electrode 541 in a through hole extending vertically and centrally through the lower movable member 521 and the bottom panel 524 of the lower housing in which lower energizing electrode 541 is fixed to the lower movable member 521 and the bottom panel 524, while is electrically isolated therefrom via an insulating member, though not shown. The lower energizing electrode 541 comprises a column-shaped electrode body 542 with a bore formed therein for defining a cooling passage which is connected to an external cooling fluid supply source, though not illustrated, so as for a cooling fluid to flow therethrough. The lower energizing electrode 541 is connected to a power supply of the sintering machine via a conductor 543. The upper energizing electrode assembly 55 comprises an upper energizing electrode 551 in a through hole extending vertically and centrally through the upper support plate 513 in which upper energizing electrode 551 is fixed to the upper support plate 513, while it is electrically isolated therefrom via an insulating member, though not shown. The upper energizing electrode 151, in the illustrated embodiment, comprises a column-shaped elongated electrode body 552 having a flange section 533 in its upper end and a bore formed therein for defining a cooling passage which is connected to an external cooling fluid supply source, though not illustrated, so as for a cooling fluid to flow therethrough. The upper energizing electrode 551 is fixed to the upper support plate 513 by attaching the flange section 553 to the upper support plate 513 with an anchor bolt, though not illustrated. In this case, the electrical insulation may be ensured between the upper energizing electrode 551 and the upper support plate 513 around the anchor bolt by using a known insulating sleeve, insulating washer and the like. The upper energizing electrode 551 extends through the hole extending vertically through the top panel 534 of the upper housing 533 and has its lower end designed to be positioned within the inner sintering chamber or the vacuum chamber C. The top panel 534 is attached with an insulating member and a sealing member, both having known structures, so as to provide electrical insulation as well as air tightness between the upper energizing electrode and the top panel. The lower energizing electrode 541 and the upper energizing electrode 551 are relatively positioned such that the center of one axis is in line with the center of the other axis.

The driving unit 56 is, in the illustrated embodiment, composed of a hydraulic cylinder 561 mounted to the table 511, in which a tip end (an upper end in the illustration) of a piston rod 562 is fixed to the lower energizing electrode while being electrically insulated therefrom. It is to be appreciated that although the hydraulic cylinder is employed as a driving unit in the above embodiment, a system for driving by an electric motor may be employed instead. The flange section 553 of the upper energizing electrode 551 is also connected to the power supply of the sintering machine via a conductor, such as a copper plate. A mechanism for driving the upper housing assembly 53 to move up and down may be constructed as a pair of hydraulic cylinders supported by the upper support plate 131, in which the piston rods housed in the cylinders are connected to the upper movable member 131 so as to move it up and down via the hydraulic cylinders. Instead of the hydraulic cylinder, an electric motor or the like may be used, and in this case, the up and down motion may be effected via a mechanism, such as a rack and pinion or a screw shaft and nut engaging therewith.

Figure 5:
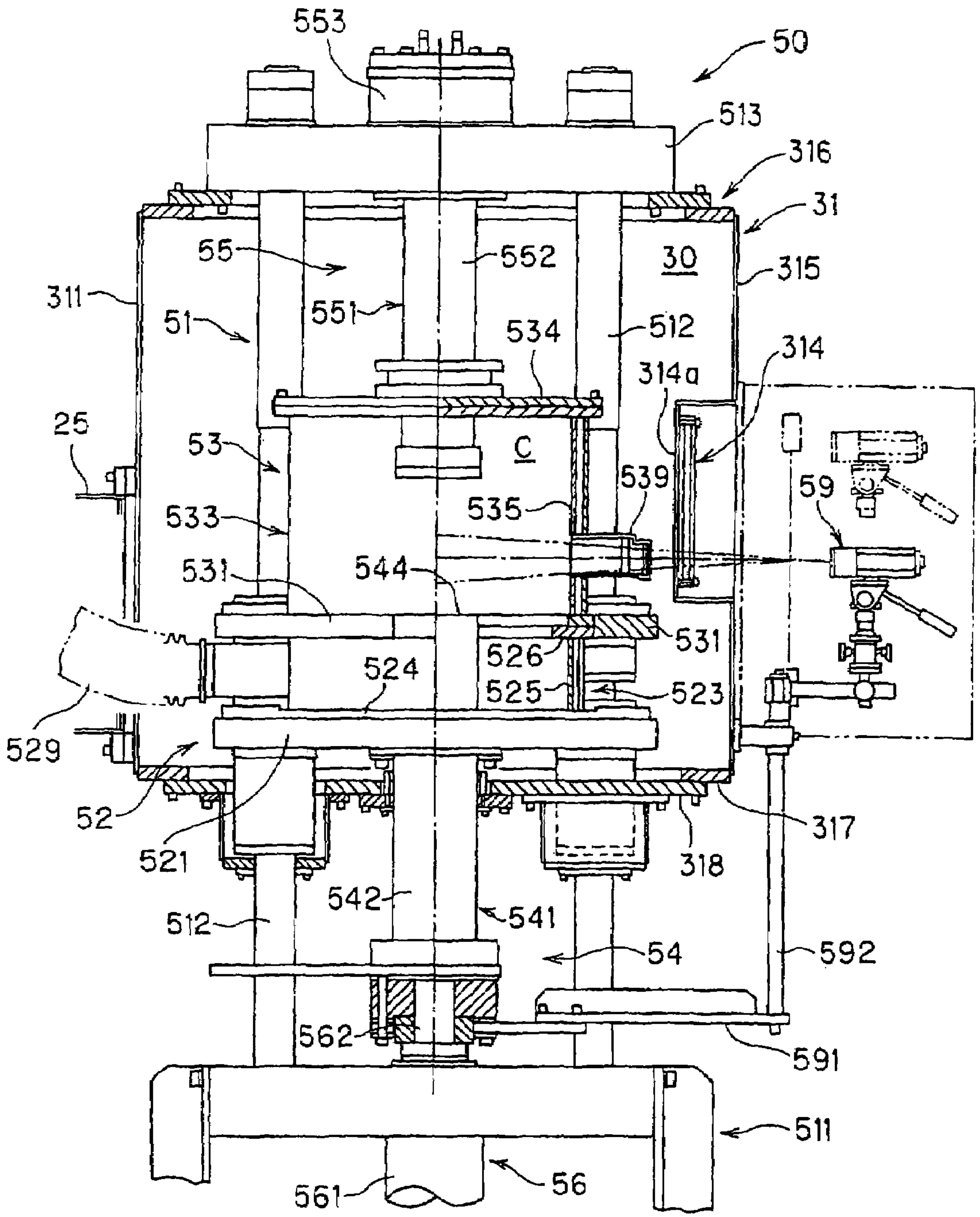
FIG. 5 is a sectional view showing details of a sintering machine of a nano-precision sintering system of FIG. 2.

As shown in FIG. 5, the top panel 316 of the second sealed housing 31 defining the sintering process chamber 30 is fixed to the under surface of the upper support plate 513 of the sintering machine 50 while keeping the air tight condition, in which the upper ends of the left and the right sidewall 311, 312, the sidewall 312 in the front side (FIG. 2) and the sidewall in the rear side are sealingly fixed to the edges of the top panel 316 by welding or the like. A ring-shaped attachment plate 317 is sealingly fixed to the lower ends of the left and the right sidewall 311, 312, the front sidewall 312 and the rear sidewall by welding or the like. A bottom panel 318 is fixedly attached to the attachment plate 317 via a known sealing device so as to maintain the air tight condition. The bottom panel 318 includes the through holes, through which the posts 512 and the lower energizing electrode 541 extend and which are provided with a sealing device of a known structure to seal the gaps between the bottom panel and the posts and the lower energizing electrode. In addition, the lower energizing electrode and the bottom panel are also electrically insulated from each other. The top panel 316, sidewalls 311, 312, 315 and so on, and the bottom panel 318 all enclose the housing forming the sintering chamber C and define the sintering process chamber 30 surrounding the sintering chamber C.

The sidewall 312 in the front side is provided with a window 313 through which the sintering process chamber 30 interior can be viewed and the window is fitted with a window glass 313*a*. This window glass also has a structure intended to prevent any breakage due to a pressure difference between the interior and the exterior of the sintering chamber by means of a known method while ensuring an air tight condition around the window. The sidewall 312 in the front side is attached with a plurality (three in the illustrated embodiment) of glove assemblies 24, each having the same structure with the glove assembly attached to the first housing 21, so that the operator can externally carry out the task which is to be done inside the sintering process chamber to the housing 31 via the gloves.

As shown in FIG. 5, the sidewall 315 in the right-hand side is provided with a vertically elongated window 314, which is also fitted with a window glass 314*a*. This window 314 is aligned with the window 539 for the vacuum chamber to allow the temperature inside the sintering chamber C to be measured by using a non-contact thermometer (an infra-red thermometer) 59. This thermometer 59 is attached to an elevating rod 592 coupled to the piston rod 562 of the hydraulic cylinder constructing the driving unit by using a member 591, so that it can be moved up and down in association with the up and down motion of the lower energizing electrode. It is to be appreciated that though not illustrated, the temperature of the sintering mold may also be measured by using a thermometer of a thermocouple type, and in this case, the direct measurement at one or more locations inside the sintering mold may be carried out concurrently, so as to increase the measurement accuracy.

Figure 6:
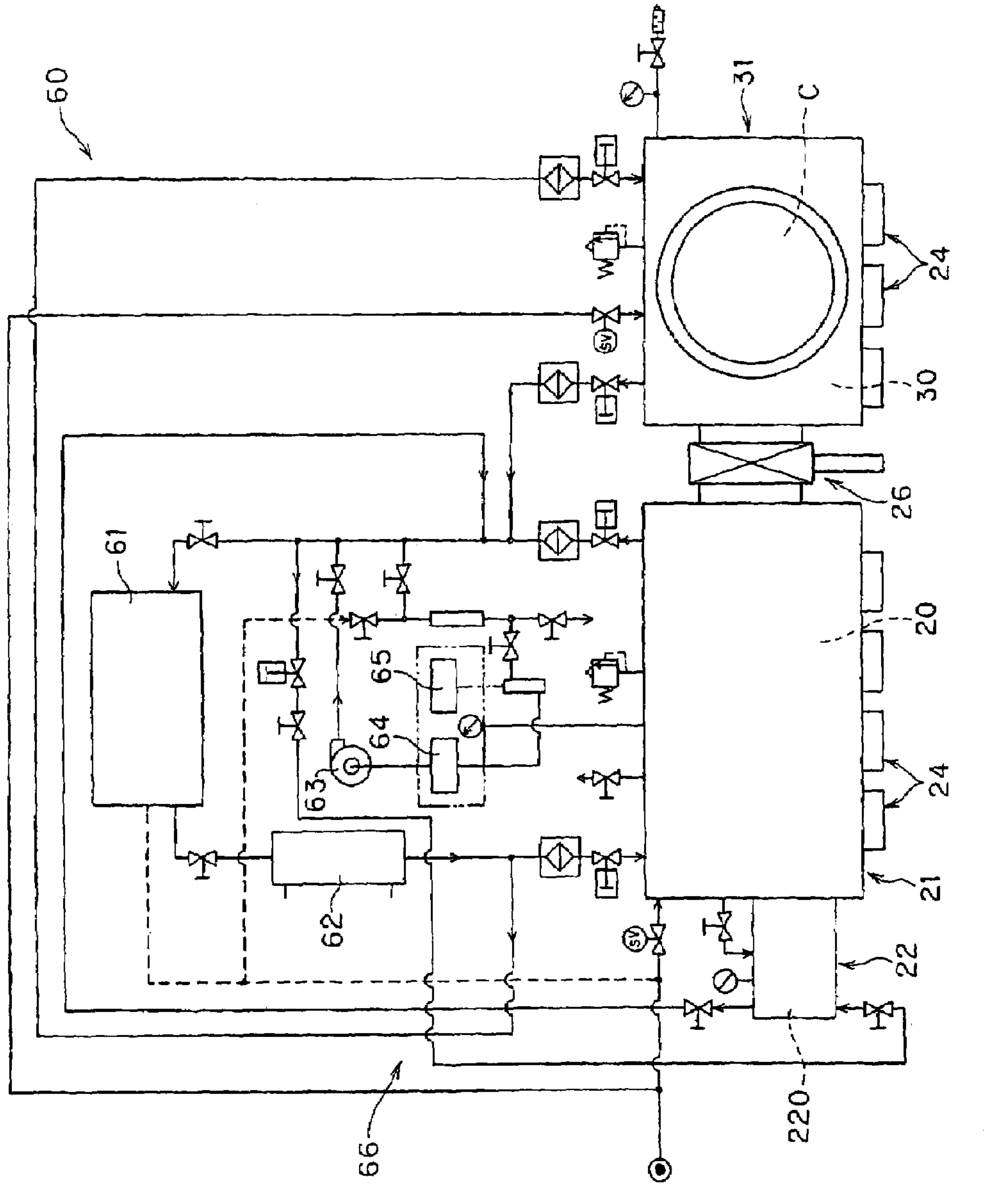
FIG. 6 shows a gas circulating and refining system of a nano-precision sintering system of FIG. 2.

As shown in FIG. 1, a gas circulating and refining system 60 is disposed behind (in the upper side in FIG. 1) the first housing 21. As shown in FIG. 6, this gas circulating and refining system 60 comprises a gas circulating and refining unit 61 of a known structure, an inert gas cooler 62, a pump 63, an oxygen concentration meter 64, and a moisture meter 65, and the gas circulating and refining system 60 is connected to the first housing 21, the loading housing 22 and the second housing 31 via a piping system 66, also as shown in FIG. 6. The gas circulating and refining system selectively feeds an inert gas, for example, argon gas into the pre-process chamber 20 defined by the first housing, the loading chamber 220 defined by the loading housing 22 and the sintering process chamber defined by the second housing so as to substitute the air inside those chambers with the inert gas, while controlling the oxygen concentration in the inert gas within the chamber into 1 ppm or lower. According to the gas circulating and refining system 60, the inert gas would be no more exhausted into the air but can be reused, thus contributing to saving resources and protecting the environment.

Figure 7:
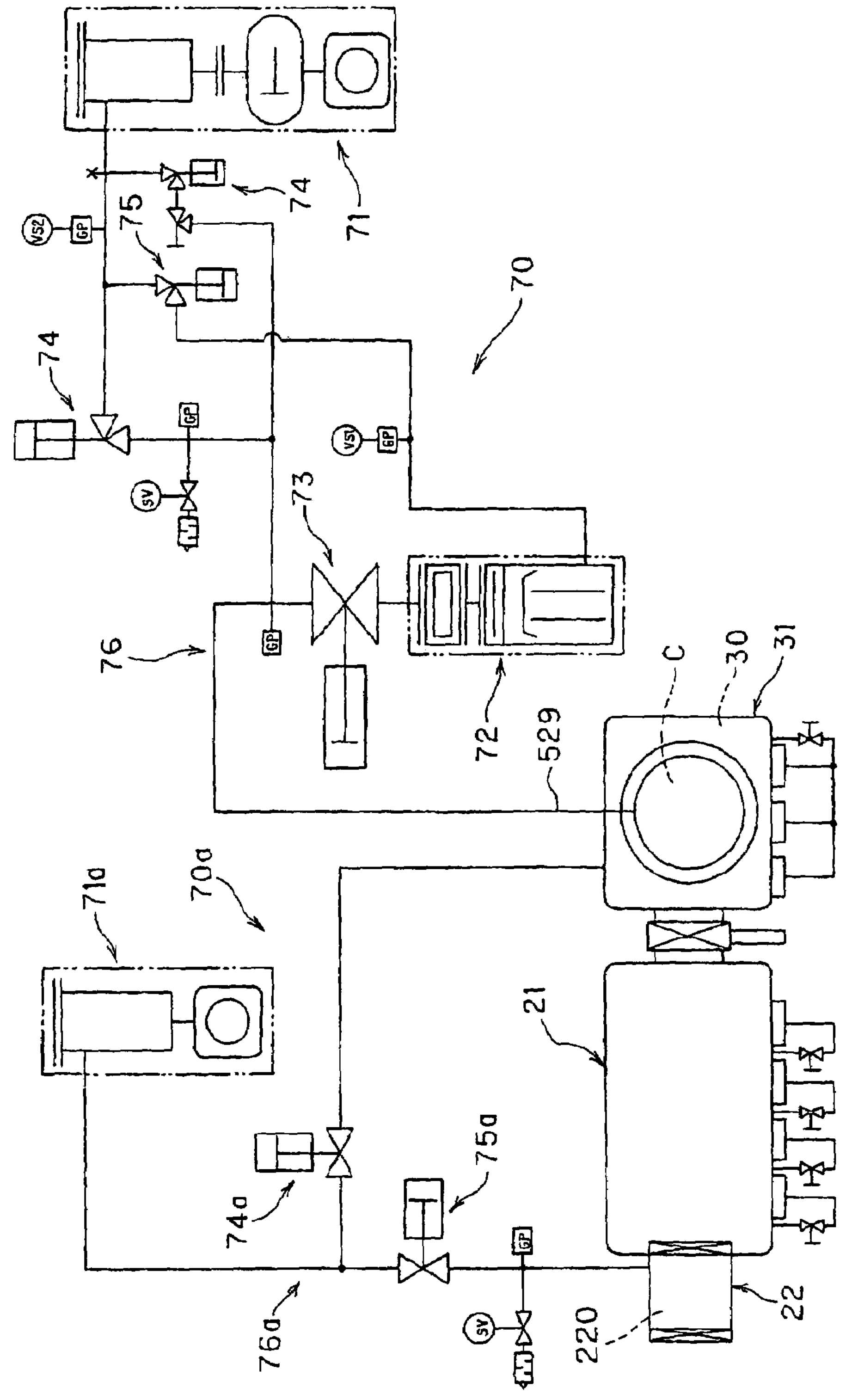
FIG. 7 shows a vacuum exhaust system of a nano-precision sintering system of FIG. 2.

The vacuum chamber C of the sintering machine 50 is connected to a first vacuum exhaust system 70 as shown in FIG. 7 via a conduit 529 coupled to the lower housing. The first vacuum exhaust system comprises a vacuum pump 71, a diffusion pump 72, a gate valve 73, a vacuum valve 74 and other valves 75, as shown in FIG. 7, all of which are interconnected via a piping system 76, as illustrated. The first vacuum exhaust system is capable of achieving a high vacuum level as $6\times10^{-3}$ Pa in the vacuum chamber C interior.

The material loading chamber 220 defined by the loading housing 22 and the sintering process chamber 30 defined by the second housing are connected to a second vacuum exhaust system 70*a*, as shown in FIG. 7. The second vacuum exhaust system 70*a* has a rotary pump 71*a* and valves 74*a*, 75*a*, which are interconnected by a piping system 76*a*. This second vacuum exhaust system may be any system capable of achieving a lower vacuum level, for example, 10 Pa in both of the material loading chamber 220 interior and the sintering process chamber 30 interior than that in the vacuum chamber C. It is to be noted that although the pre-process chamber 20 is not connected to the second vacuum exhaust system 70*a* in the illustrated embodiment, they may be interconnected. In addition, instead of the pre-process chamber being connected to the second vacuum exhaust system, the connection of the material loading chamber or the sintering process chamber with the second vacuum exhaust system 70*a* may not be provided.

A process for producing a nano-precision sintered compact by using the above-described system will now be described.

Figure 8:
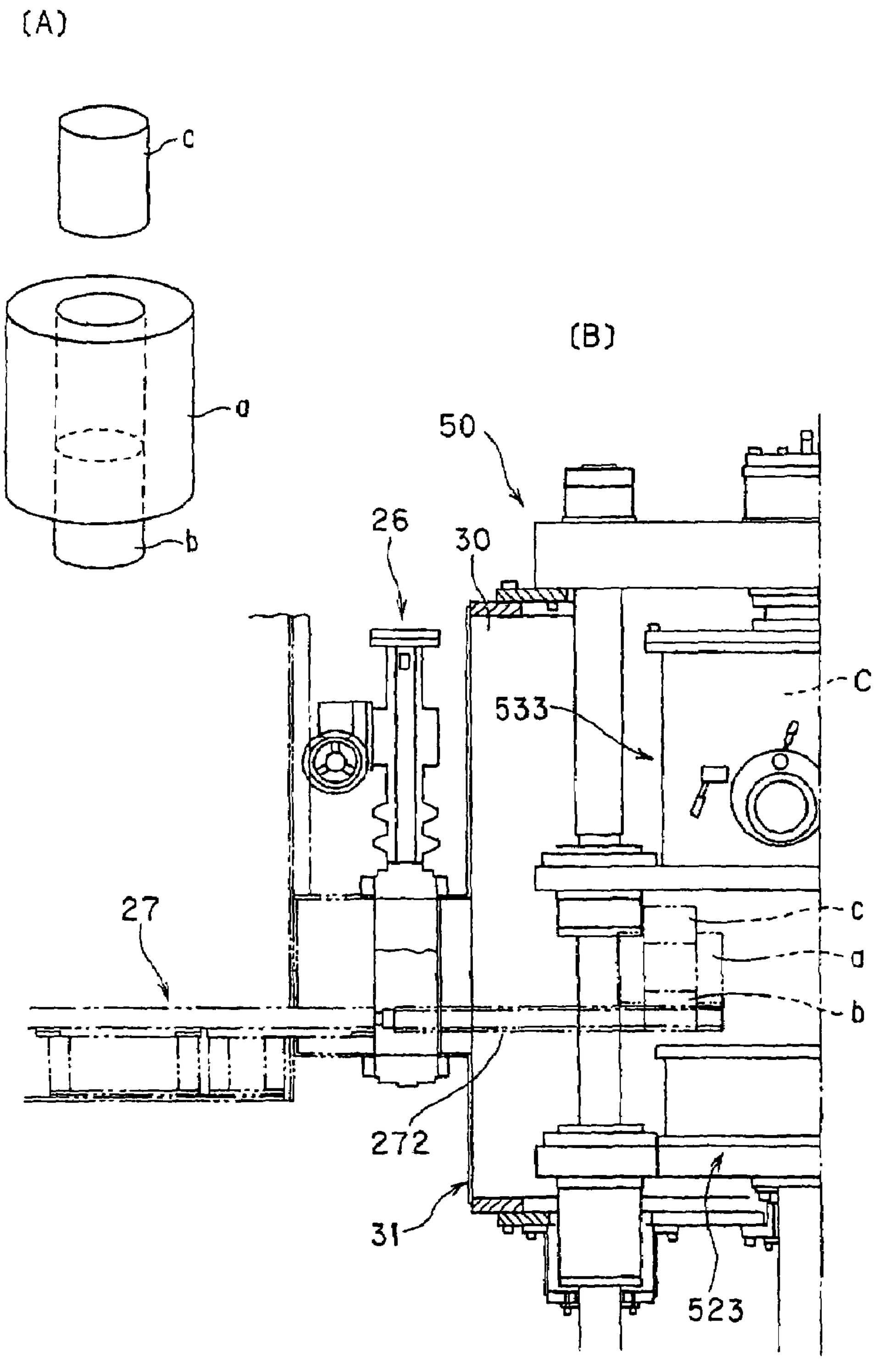
FIG. 8[A] is a perspective view showing a sintering mold and a punch member and FIG. 8[B] shows a sintering mold having delivered into a sintering process chamber.

First of all, prior to using the system, a sintering mold "a" to be used in the sintering along with an upper and a lower press cores or punch members, "b" and "c", to be inserted into an opening of the sintering mold (each of which is illustrated in FIG. 8[A]) are loaded in the pre-process chamber 20. In addition, the lid 245 of each glove assembly 24 is also previously fitted in the holding member 242. Then, the cover 222 disposed in the opening end of the loading chamber 22 is opened by using hands, and granules or powder of a material, for example, SiC or $Al_2O_3$, intended to use in the sintering should be previously loaded in the material loading chamber 220 as it is packed in a container. After the loading of the material into the material loading chamber 220 having been completed, the cover 222 is closed manually to seal the material loading chamber in the air tight condition.

Subsequently, an operation is started to substitute the air in the pre-process chamber 20 interior and the sintering process chamber 30 interior with the inert gas, for example, the argon gas, and at the same time to control the oxygen concentration in the inert gas into a desired level (e.g., 1 ppm or lower, preferably 0.2 to 0.3 ppm). When substituting the air in the chamber interior with the inert gas, in consideration of the fact that injecting the inert gas into the chamber interior that is presently filled with the air will exhibit poor substitution efficiency, the chamber subject to the substitution (i.e., the material loading chamber and the sintering process chamber in the illustrated embodiment) is first evacuated by the second vacuum exhaust system 70*a* to be held at a negative pressure and then the inert gas is immediately injected into the chamber, wherein when the chamber interior has turned to have the negative pressure, the glove interior is also brought into the negative pressure condition through an air passage 242*f* formed in the holding member 242 to make a balance of pressure. During the evacuation, the gate valve disposed between the pre-process chamber 20 and the sintering process chamber 30 and the gate valve disposed between the pre-process chamber 20 and the material loading chamber 220 are in the opening positions, so that the pre-process chamber can also be evacuated. All of the material loading chamber interior, the pre-process chamber interior and the sintering chamber interior are entirely filled with the inert gas by the gas circulating and refining system 60, and further, the oxygen concentration in the inert gas that has filled all chambers entirely is lowered to the desired level (e.g., 1 ppm or lower).

After confirming that the oxygen concentration in the inert gas has been equal to or lower than the predetermined level, the gate valve (not illustrated) partitioning the material loading chamber 220 and the pre-process chamber is open, and the material contained in the material loading chamber is taken in the pre-process chamber by handling through the glove from the pre-process chamber. After the gate valve having been closed, the following series of operations is carried out manually by the operator via the gloves: manipulating the bowl mill 41 to prepare the powder of a material; storing the prepared powder of a material into the desiccator 42; measuring the weight of the powder of a material 43 to be used in the sintering by the electronic weighing meter 43; filling the sintering mold "a" fitted with the lower punch member "b" with the prepared powder of a material; fitting the upper punch member "c" in the sintering mold "a", after the filling having been completed; and pressing the powder of a material by using the hand press 44 (pushing both punch members to press against the powder of a material between the punch members), all of the above series of operations being carried out under visible inspection through the window 213. The combination unit of the sintering mold and the punch members after having completed the pressing operation is placed on the movable table 272 of the conveyer system 27 (at one end close to the gate valve 26). The pre-process operations have all been completed.

It is to be noted that if the powder of a material that has been previously prepared outside to the sintering system of the present invention is used, a sealed container (e.g., a sealed container in the form of a vacuum packed or an inert gas charged container) loaded with the powder of a material may be introduced into the pre-process chamber 20 through the material loading chamber 22, as described above, and then unsealed for the powder of a material to be taken out within the pre-process chamber for subsequent use.

Subsequently, the gate valve 26 is opened to establish communication between the pre-process chamber 20 and the sintering process chamber 30, and the movable table 272 of the conveyer system 27 is moved through the passage into the sintering process chamber 30. Prior to the above operation, the lower housing 523 and the upper housing 533 of the sintering machine 50 are apart from each other vertically, as the former held in the lower position and the latter held in the upper position, as shown in FIG. 8[B], and they are ready for approaching to the sintering chamber C via the gloves. When the movable table 272 has been pushed and advanced farthest into the sintering chamber 30, the combination unit of the sintering mold "a" filled with the powder of a material together with the punch members "b" and "c", would have been delivered to a position closely proximal to the lower energizing electrode 541, as shown in FIG. 8[B]. Under such condition, the combination unit of the sintering mold and the others placed on the movable table is set on the upper surface 544 of the lower energizing electrode by the operator's hands via the pair of gloves 24 attached to the second housing 31. The setting of the sintering mold and the others onto the sintering machine 50 has been then completed.

After the setting having been completed, the movable table 272 is returned into the pre-process chamber 20 by the hands, and then the gate valve 26 is placed into the closing position to separate the sintering chamber 30 from the pre-process chamber 20. Subsequently, the upper housing 533 of the sintering machine is lowered to bring the upper and the lower housings into engagement, so that the vacuum chamber defined by both housings can be isolated from the sintering process chamber, while at the same time, the driving unit 56 is activated to move the lower energizing electrode 541 upward, so that the punch member can be clamped between the upper surface of the lower energizing electrode 541 and the lower surface of the upper energizing electrode 551. After that, the vacuum chamber is evacuated by the vacuum exhaust system 70 into the vacuum condition (e.g., $6\times10^{-3}$ Pa), where the sintering process is carried out by applying a direct pulsed current (e.g., from 1000 A to 10000 A) to the powder of a material, while at the same time applying a pressure to the same by the driving unit.

Once the sintering process having been completed, the gate valve 26 is opened after the vacuum chamber having been released from the engagement and then the movable table of the conveyer system 27 is moved into the sintering process chamber, where after having waited for the sintering mold to cool off, the combination of the sintering mold with the others is transferred onto the movable table by the hands via the gloves and then further conveyed by the movable table into the pre-process chamber, where in turn the sintered compact produced in the sintering process is taken out of the sintering mold "a" by using the hand press and then the sintering compact is brought out through the material loading chamber.

Although the nano-precision sintering system of the above illustrated embodiment is suitable for producing a single unit of sintered compact, for example, a prototype, it may be feasible to shift the sintered compact with a specification determined from the prototype into mass-production with this system by additionally installing and/or sharing an apparatus which is capable of automatically carrying out the series of manually handled operations as described above in the material loading chamber, the pre-process chamber and the sintering process chamber, together with a control unit for automatically controlling the operations of the same apparatus. In this case, preferably the powder of a material that has been previously prepared and packed in a sealed container externally to the system should be used.

Specifically, an automated conveyer system capable of delivering the sealed container containing the powder of a material into the pre-process chamber may be arranged in the material loading chamber to thereby provide the automated operation of the conveyer system 27 as described above. Further, additional units may be arranged in the pre-process chamber 20 including: a hopper for receiving a powder of a material; a supplying system operable to measure and dispense the powder of a material contained in the hopper for supplying; a filling system for receiving the predetermined amount of powder of a material supplied from the supplying system and filling a sintering mold with it; a punch member inserting device for inserting an upper punch member into the sintering mold filled with the predetermined amount of the powder of a material; and a pressing device for pressing the powder of a material in the sintering mold, together with a robot serving to unseal a sealed container of the powder of a material and loading the powder of a material into the hopper as well as a transfer robot serving to transfer the sintering mold between the filling system and the punch member inserting device and the pressing device, wherein those operations may be adapted to be automatically controlled by the automatic control unit. Further, an additional robot may be arranged within the sintering process chamber 30, which is capable of setting the combination of the sintering mold with the punch members delivered by the conveyer system 27 in a predetermined position in the sintering machine and of removing the combination of the sintering mold with the punch members therefrom after the sintering process having been completed, whose operations may also be controlled automatically by the automatic control unit.

Further, although the above description of the embodiment has been given with reference to the housing 21, 31 which are provided with the glove assembly, alternatively only the automated equipment as described above may be arranged in the housing 21, 31 but the glove assembly should be omitted, to thereby allow the sintering process to be carried out in a fully automated manner. In this case, the production of the sintered compact as the prototype may be performed in another facility, and once the feasibility of mass-production has been determined, the sintering process may be carried out by the automated equipment.

As apparent from the above description, according to the present invention, since it becomes feasible: to produce a nano-order minute powder (i.e., a powder having a powder size in itself defined by the nano order and a powder having the powder size defined by the micron order but having a crystalline structure defined by the nano order) without exposing a sintering material to the atmosphere, particularly to oxygen; to fill a sintering mold with the thus produced powder of material without exposing to the atmosphere, particularly to oxygen, and/or to moisture; and to set the sintering mold filled with the powder of a material in a sintering machine without exposing to oxygen; and further to carry out the sintering process in a vacuum atmosphere, therefore it can be realized that the sintering process may be carried out while completely protecting the powder of a material against oxidation by oxygen as well as the contamination by dust, dirt, adsorbed moisture and the like, and accordingly that a nano-structured sintered compact with high purity and high quality, especially such nano-structured sintered compact of high precision uniquely achieved by the SPS sintering process characterized in a reactive sintering in the grain boundary can be produced.

INDUSTRIAL APPLICABILITY

According to the present invention, a nano-precision sintering system can produce a nano-structured sintered compact having extremely high purity with no impurities contained, and thus the present invention can find applications in studying and developing as well as producing a variety of nano-phase materials based on metals or ceramics and nano composite materials (electronic materials).

The invention claimed is:

1. A nano-precision sintering system for sintering a nano-sized powder of a material in a pulse energization and pressure sintering process to obtain a highly purified sintered compact having a nano-sized grain structure, said nano-precision sintering system characterized by comprising:

at least one pre-process chamber defined by at least one sealed housing and designed to be controlled into a predetermined atmosphere;

a sintering process chamber defined by a sealed housing and designed to be controlled into a predetermined atmosphere;

a shut-off system operatively disposed in a passage providing communication between said pre-process chamber and said sintering process chamber so as to block the communication between said both chambers selectively while keeping it in an air tight condition; and a pulse energization and pressure sintering machine having a vacuum chamber allowing for said sintering process to be carried out under a vacuum atmosphere or an inert gas atmosphere, wherein said vacuum chamber is disposed in said sintering process chamber such that said vacuum chamber can be isolated from said sintering process chamber, measuring a weight of said powder of a material, filling a sintering mold with said powder of a material, inserting an upper punch into said sintering mold and pressing said powder of a material in said sintering mold are executable within said pre-process chamber, and placing said sintering mold filled with said powder of a material into said sintering machine can be carried out under the predetermined atmosphere within said sintering process chamber without being exposed to an external air.

2. A nano-precision sintering system in accordance with claim 1, further comprising a material loading chamber disposed adjacent to said pre-process chamber such that said material loading chamber can be sealed against external air and also can be isolated from said pre-process chamber selectively while being held in an air tight condition, wherein an interior of said material loading chamber can be controlled into a predetermined atmosphere.

3. A nano-precision sintering system in accordance with claim 1, in which said vacuum chamber is coupled to a first vacuum exhaust system, and at least one of said pre-process chamber and said sintering process chamber is coupled to a second vacuum exhaust system independent from said first vacuum exhaust system.

4. A nano-precision sintering system in accordance with claim 2, in which said vacuum chamber is coupled to a first vacuum exhaust system, and said material loading chamber and said sintering process chamber are coupled to a second vacuum exhaust system independent from said first vacuum exhaust system.

5. A nano-precision sintering system in accordance with claim 1, further comprising a mill for mixing and grinding said powder of a material, a weighing scale for measuring a weight of said powder of a material prepared by said mill and a pressing device for pressing said powder of a material filled in said sintering mold, all of which are disposed in said pre-process chamber.

6. A nano-precision sintering system in accordance with claim 1, further comprising a conveyer system disposed in said pre-process chamber for delivering said sintering mold filled with said powder of a material through said passage into said sintering process chamber.

7. A nano-precision sintering system in accordance with claim 1, in which said pre-process chamber, said material loading chamber and said sintering process chamber are coupled to a gas circulating and refining system capable of supplying an inert gas to said chambers and also capable of decreasing an oxygen concentration in said inert gas to 1 ppm or lower.

8. A nano-precision sintering system in accordance with claim 1, further comprising a glove assembly, said glove assembly comprising: an attachment member fixed to a sidewall of said housing as being held in the air tight condition; a holding member removably attached to said attachment member so as to cooperate with said attachment member to clamp and hold an opening region of said glove; and a lid adapted to be removably fitted in said holding member.

9. A nano-precision sintering system in accordance with claim 1, in which said sealed housing defining said pre-process chamber comprises at least one pair of gloves, and said sealed housing defining said sintering process chamber comprises at least one pair of gloves, wherein measuring a weight of said powder of a material, filling a sintering mold with said powder of a material, inserting an upper punch into said sintering mold and pressing said powder of a material into said sintering mold, all to be executed within said pre-process chamber, are executable by an operator via said gloves and said placing said sintering mold filled with said powder of a material into said sintering machine is executable by the operator via said gloves of said sintering chamber.

10. A nano-precision sintering system in accordance with claim 1, further comprising within said pre-process chamber: a hopper for receiving said powder of a material; a supplying system operable to measure and dispense said powder of a material contained in said hopper for supplying; a filling system for filling said sintering mold with a predetermined amount of said powder of a material supplied by said supply system; a means for unsealing a sealed container delivered into said pre-process chamber and loading said powder of a material contained therein into said hopper; and an automatic control unit for controlling automatically an operation of said systems and means.

* * * * *